Figure 1:
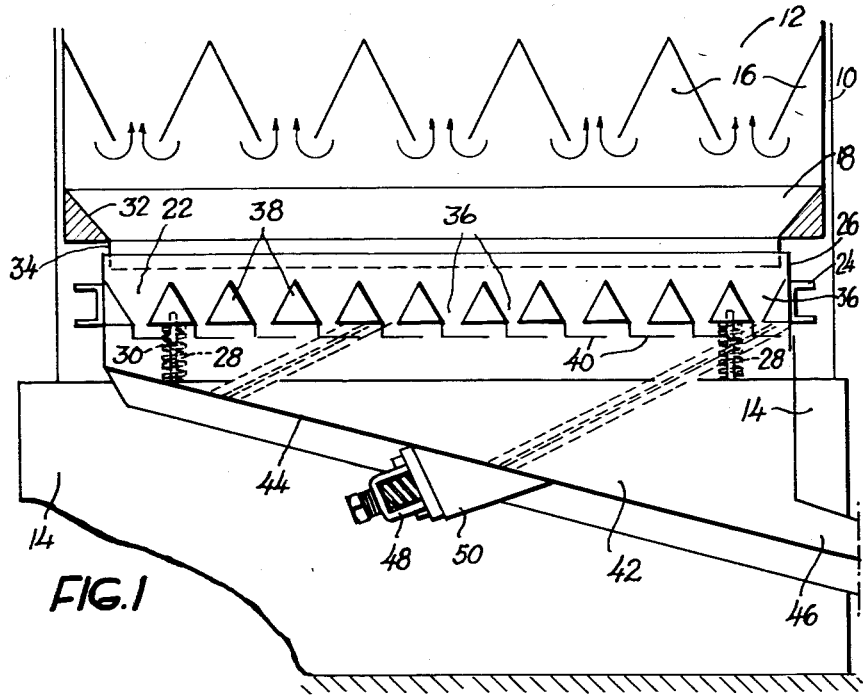

Oct. 10, 1961

A. S. JONSSON 3,003,667

DEVICE FOR THE DISCHARGE OF GRAIN OR
SIMILAR SMALL-SIZED MATERIAL

Filed Oct. 18, 1957

2 Sheets-Sheet 1

INVENTOR

ANDERS SIGVARD JONSSON

BY Irwin S. Thompson

ATTY.

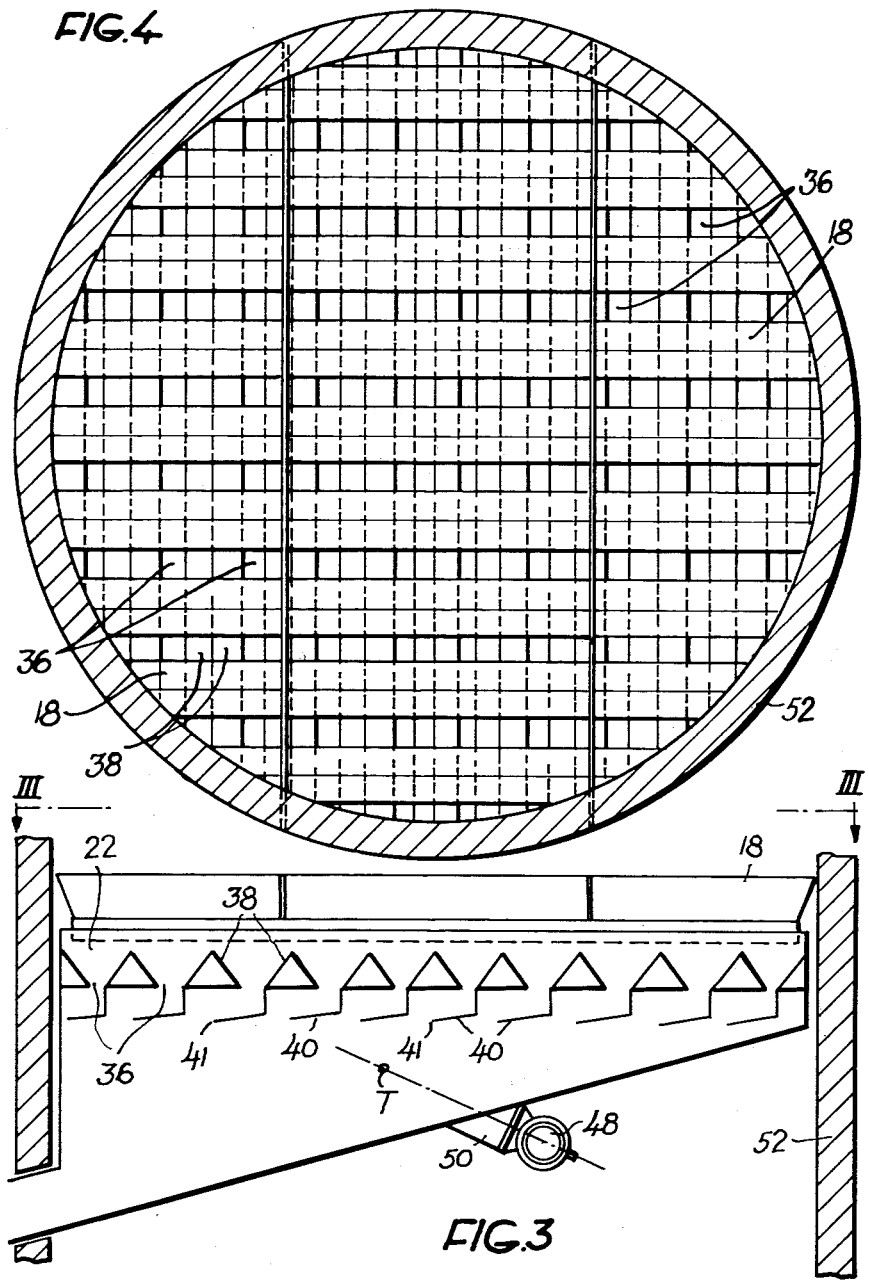

United States Patent Office 3,003,667
Patented Oct. 10, 1961

3,003,667
DEVICE FOR THE DISCHARGE OF GRAIN OR SIMILAR SMALL-SIZED MATERIAL
Anders Sigvard Jonsson, Johanneshov, Sweden; Fritz Belfrage, administrator of said Anders Sigvard Jonsson, deceased, assignor to Nils Fredrik Rudebeck, Stocksund, Sweden
Filed Oct. 18, 1957, Ser. No. 691,011
Claims priority, application Sweden Oct. 24, 1956
6 Claims. (Cl. 222—199)

In corn dryers, silos and other devices comprising a shaft for the treatment or storage of grain-shaped or other small-sized material, there arises the problem of an even discharge of the material from the shaft. By the expression "even" there is understood a discharge which in ideal cases causes the material in the shaft to sink with equal velocity at all points of any horizontal section of the shaft. Usually, such a condition is not obtainable. For instance, in silos including a bottom hopper, the material sinks more rapidly in the centre of the shaft right above the discharge opening of the hopper than at the periphery of the shaft. During aeration of the material which is necessary from time to time to prevent damages to the material due to storage, the material will consequently be discharged and aerated in an uneven manner resulting in a poor and delayed aeration. In continuously discharged corn dryers there is the additional risk of a part of the grain remaining too long in the shaft with resulting damage to the grain with respect to the capacity of germination, whereas another part passes too rapidly through the shaft so as not to become completely dried.

The object of this invention is to provide a discharge device which renders possible an even discharge from a shaft which contains grain-shaped or other small-sized material. The invention may be used in connection with corn dryers, silos and similar apparatus.

The invention is primarily characterized by the fact that below the bottom opening of the shaft there is provided an upwardly open discharge box which is free from the shaft and includes beams and dispersion shelves and which is subject to the action of an agitator. Preferably, the box is resiliently suspended so as to be able to vibrate independently of the shaft.

Due to the vibration the material will, to a certain extent, behave as a liquid, and at the upper opening of the discharge chamber the material will assume a plane horizontal surface such that equal amounts of material will flow to the separate discharge slots.

In order to prevent the material from flowing too rapidly to the discharge openings as a result of the vibration and to improve the distribution of the material during its discharge movement, horizontal or slanting dispersion shelves may be arranged below the discharge slots and in parallel relation thereto so as to receive the material falling down through the slots prior to its entering a collecting chamber. The dispersion shelves may consist of angle-plates having vertical flanges secured to the edges of the discharge slots and horizontal flanges extending below the slots.

In order to relieve the discharge chamber from the weight of the material in the shaft located above said chamber, weight-relieving members may be provided in the lower part of the shaft above the chamber. Said weight-relieving members may consist of horizontal beams extending transversely throughout the shaft and forming between themselves downwardly converging passage slots. Said slots extend advantageously at right angles to the discharge slots of the discharge chamber, resulting in a more favourable distribution of the material along this section of the shaft.

Figure 2:
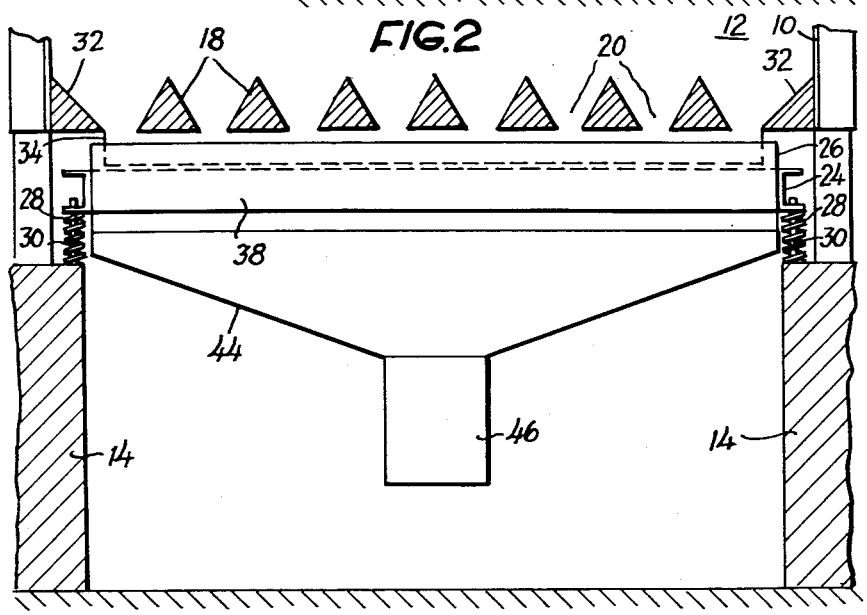

Two forms of construction of the invention are illustrated, by way of example, in the annexed drawing. FIGS. 1 and 2 are two central vertical sectional views, taken at right angles to each other, of the lower part of a drying-shaft and an appertaining discharge device constructed in accordance with the invention. FIG. 3 illustrates in a manner similar to FIG. 1 a vertical central section view of the lower part of a silo having a discharge device according to the invention. FIG. 4 is a horizontal sectional view along the line III—III of FIG. 3.

In FIGS. 1 and 2, numerals 10 denote vertical walls of a drying-shaft 12 having a square or other suitable cross-sectional shape. The shaft is supported at its lower end by a concrete base 14 and is of the type provided with horizontal aerating bars or beams 16 constituted by downwardly open troughs which form passages for drying-air. At its lower end, the shaft further has a plurality of parallel weight-relieving members constituted by bars or beams 18 having such a cross-sectional shape as to form between themselves downwardly converging slots 20 for the passage of the material. These beams serve the purpose of resisting the weight of the material stored in the shaft so as to relieve the discharge chamber located below the beams.

In addition to the weight-relieving members, the discharge device comprises a discharge chamber 22 confined by a box which consists of a preferably rectangular frame 24 formed by, for instance, U-shaped beams and walls 26 provided on the inside of the frame and consisting of sheet-metal or the like material. The frame 24 rests on springs 28 and is guided by vertical pegs 30 which are secured to the base 14 and freely extend through holes in the flanges of the beams of the frame. Slanting guide faces 32 at the lower ends of the side walls of the shaft cause the material to move down through a collar 34 into the upwardly open discharge chamber 22.

The discharge chamber 22 merges at its lower end into a plurality of downwardly converging discharge slots 36 formed between horizontal parallel bars or beams 38 the ends of which are secured to two opposite sides of the box formed by the beams 24 and sheet-metal walls 26. The beams 38 may consist of sheet-metal boxes having the shape of isosceles triangles as viewed in cross-section.

Below the discharge slots 36 there are provided dispersion shelves 40 which receive the dried material flowing down through the discharge slots 36. The dispersion shelves may consist of angle-irons or angle-plates having vertical flanges secured at the edges of the discharge slots 36 and horizontal flanges extending below the slots, as shown in FIG. 1.

The walls 26 of the box extend somewhat below the discharge slots 36 and the shelves 40 and confine at their lower ends a collecting chamber 42 having a slanting bottom 44 which at one end opens into an outlet chute 46 through which the material falling from the shelves down to the bottom 44 is removed.

An agitator 48 which is advantageously magnetically operated is connected with the box, preferably at the centre of the bottom 44. The agitator is secured to a boss 50, preferably in a position such that the direction of vibration is toward the centre of gravity of the box.

The weight-resisting beams 18 at the lower end of the shaft extend advantageously at right angles to the beams 38 which form the discharge slots 36 of the chamber 22, resulting a more even distribution of the material over the horizontal sections of the shaft and the discharge chamber.

The mode of operation of the embodiment described is on the whole as follows:

When the discharge box is vibrated by means of the agitator 48 the small-sized material falls down from the free edges of the dispersion shelves 40 into the collecting chamber 42. Fresh material then falls down onto the shelves through the discharge slots 36 which are evenly distributed over the horizontal section of the box. As the material is thus discharged, it will sink down in the shaft toward the discharge chamber 22. Since the discharge chamber has a great number of comparatively narrow, evenly distributed discharge slots, the material will sink down uniformly over the entire horizontal section of the shaft resulting in that the velocity of the downward movement at the periphery of the shaft will be equal or substantially equal to the velocity at the central part of the shaft. To a certain degree, the weight-supporting beams 18 contribute toward this effect, particularly in view of the fact that the passage slots 20 formed between said beams extend at right angles to the discharge slots 36. The dispersion shelves 40 contribute toward an evenly distributed discharge and prevent too rapid passage of the material through one or more of the discharge slots.

Due to the even and uniform downward movement of the material in the shaft, the material will be uniformly dried at all places in the shaft, that is, the material at the periphery will be dried to the same degree as the material at the central portion. Excessive heating of the material at certain places in the shaft and resulting damages to germination will thus be prevented.

FIGS. 3 and 4 illustrate an embodiment having a discharge device for a silo constructed substantially in the same manner as that described above. The ends of the weight-supporting beams 18 may be cast into the wall 52 of the cylindrical silo. Reinforcing plates 54 standing on edge are connected with the beams 18 and extend at right angles thereto and may also be cast into the wall of the silo. The discharge slots 36 of the discharge chamber 22 are formed between beams 38 which are triangular in cross-section as in the previous embodiment. However, in the present instance the dispersion shelves 40 are not horizontal, but are slanting somewhat toward their free edges 41. The angle of inclination depends upon the nature of the material to be discharged and is greater for materials having a higher internal friction in the body of the material than for materials having a smaller friction, that is, materials which flow down more easily under the influence of the vibrations. The direction of vibration of the agitator 48 is toward the centre of gravity T of the box, as shown in FIG. 3.

From FIG. 4 it will be seen that the horizontal section through the weight-supporting beams 18 and the perpendicular discharge beams 38 is divided into a great number of discharge passages 36 which are evenly distributed over the entire section. Through these passages the material will be able to flow down in continuous streams with small internal friction. The shelves 40 act as brakes on these streams such that the downward movement of the material will take place at the velocity defined by the agitator and the angle of inclination, if any, of the shelves.

The discharge device described may be advantageously used for the discharge of material from a silo for the purpose of aerating. Due to the even downward movement, the aerating periods will be shortened and the required volume of the silo will be reduced.

The invention is not limited to the embodiments described by way of example only. Although the triangular cross-sectional shape of the weight-supporting beams and discharge beams is most simple from a constructional point of view, other cross-sectional forms, such as crescent-shaped or similar ones, forming between themselves downwardly converging slot-like passages may be used instead.

The agitator may be operated magnetically or by means of a motor and is suitably provided with control means for varying the amplitude of vibration from zero to a maximum value. In this case it is possible merely by adjustment of the agitator to control the amount of discharge such that the discharge is entirely cut off at zero amplitude and amounts to its maximum per unit of time at the maximum amplitude. Any desired intermediate amounts of discharge are obtained by corresponding adjustment of the control means of the agitator into intermediate positions.

When applied to silos, particularly for grain or corn, the invention results in the surprising effect that the formation of different layers of material and the accumulation of light-weight material and foreign matter at the top of the silo, as is the case in silos having a central discharge hopper at the bottom, is entirely eliminated as a result of the even downward movement of the material resulting from the invention. In conventional constructions of silos the formation of different layers of the material results in that the light-weight material is discharged last of all from the silo. Consequently, the quality of the discharged grain becomes inferior as the discharge operation proceeds, and the last discharged material will have the poorest quality. This drawback is eliminated by the device according to the invention which prevents the formation of different layers and discharges the material in the same mixed condition in which the material is in the silo at the beginning of the discharging operation.

What I claim is:

1. In a device for the discharge of pulverized, grain-shaped, or other small size material from a container, fixed beams having sloping edges to form first downwardly converging passages for said material, a frame provided with bars set substantially at right angles to said beams in a vertically spaced relationship to form second downwardly converging passages for said material, substantially horizontal dispersion shelves fixed to said bars in a vertically spaced relationship below the second passages, vibrating means for said frame, and a downwardly tapered collecting device for said material.

2. In a device for the discharge of pulverized, grain-shaped, or other small size material from a container, fixed beams having sloping edges to form first downwardly converging passages for said material, spaced fixed grids having sloping edges to form intermediate downwardly converging passages for said material, said fixed grids set substantially at right angles to said fixed beams in a vertically spaced relationship, a frame provided with bars having sloping edges to form second downwardly converging passages for said material, said bars set substantially at right angles to said fixed grids in a vertically spaced relationship, substantially horizontal dispersion shelves fixed to said bars in a vertically spaced relationship, vibrating means for said bars, and a downwardly tapered collecting device for said material.

3. A device according to claim 2 wherein the beams, the grids, and the bars are substantially triangular in cross section.

4. A device according to claim 1 wherein the beams and the bars are substantially triangular in cross section.

5. In a device for the discharge of pulverized, grain-shaped, or other small size material from a container, fixed beams having sloping edges to form first downwardly converging passages for said material, spaced fixed grids having sloping edges to form intermediate downwardly converging passages for said material, said fixed grids set substantially at right angles to said fixed beams, said grids mounted below and spaced from said beams in vertical relationship, a frame provided with bars having sloping edges to form second downwardly converging passages for said material, said bars set substantially at right angles to said fixed grids, said frame mounted below and spaced from said fixed grids in vertical relationship, substantially horizontal dispersion shelves fixed to said bars and spaced vertically therefrom, vibrating means for said frame and bars to discharge and aerate the material emanating from the container in a substantially even manner, and a downwardly tapered collecting means for said material.

6. A device according to claim 5 wherein the beams, grids and bars are substantially crescent shaped in cross section.

References Cited in the file of this patent

UNITED STATES PATENTS

| | | |
|---|---|---|
| 117,718 | Arey | Aug. 8, 1871 |
| 1,366,781 | Freeman | Jan. 25, 1921 |
| 1,880,287 | Sifton | Oct. 4, 1932 |
| 2,148,946 | Hubmann et al. | Feb. 28, 1939 |
| 2,276,382 | Francis | Mar. 17, 1942 |
| 2,584,444 | Grueneberg | Feb. 5, 1952 |
| 2,734,688 | Sloane | Feb. 14, 1956 |
| 2,789,733 | Secord | Apr. 23, 1957 |